US012770961B2

(12) United States Patent
Hwang et al.

(10) Patent No.: US 12,770,961 B2
(45) Date of Patent: Oct. 20, 2026

(54) POUCH FILM LAMINATE BODY AND BATTERY CASE MANUFACTURED USING SAME

(71) Applicant: LG Energy Solution, Ltd., Seoul (KR)

(72) Inventors: Soo Ji Hwang, Daejeon (KR); Dae Woong Song, Daejeon (KR); Sang Hun Kim, Daejeon (KR); Hyung Kyun Yu, Daejeon (KR); Min Hyeong Kang, Daejeon (KR); Hun Hee Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/722,855

(22) PCT Filed: Dec. 22, 2022

(86) PCT No.: PCT/KR2022/021112

§ 371 (c)(1),
(2) Date: Jun. 21, 2024

(87) PCT Pub. No.: WO2023/121364

PCT Pub. Date: Jun. 29, 2023

(65) Prior Publication Data

US 2024/0421391 A1 Dec. 19, 2024

(30) Foreign Application Priority Data

Dec. 24, 2021 (KR) ........................ 10-2021-0187275

(51) Int. Cl.
*H01M 50/105* (2021.01)
*H01M 50/119* (2021.01)
(Continued)

(52) U.S. Cl.
CPC ....... *H01M 50/129* (2021.01); *H01M 50/105* (2021.01); *H01M 50/119* (2021.01); *H01M 50/121* (2021.01); *H01M 50/133* (2021.01)

(58) Field of Classification Search
CPC ............. H01M 50/105; H01M 50/129; H01M 50/119; H01M 50/121
See application file for complete search history.

(56) References Cited

U.S. PATENT DOCUMENTS

2003/0054241 A1* 3/2003 Yamashita .......... H01M 50/198
429/184
2009/0104467 A1* 4/2009 Son ......................... B32B 7/022
156/306.6
(Continued)

FOREIGN PATENT DOCUMENTS

JP 2000340186 A 12/2000
JP 2001519962 A 10/2001
(Continued)

OTHER PUBLICATIONS

Jis H 4160-1994 standard (Year: 1994).*
(Continued)

*Primary Examiner* — Yoshitoshi Takeuchi
(74) *Attorney, Agent, or Firm* — Lerner David LLP

(57) ABSTRACT

Disclose herein is a pouch film laminate body including a gas barrier layer, a base layer disposed on one surface of the gas barrier layer, and a sealant layer disposed on the other surface of the gas barrier layer. A loop stiffness of the pouch film laminate body in machine direction of the pouch film laminate body may be 750 mN to 1300 mN.

8 Claims, 3 Drawing Sheets

(51) Int. Cl.

| | |
|---|---|
| ***H01M 50/121*** | (2021.01) |
| ***H01M 50/129*** | (2021.01) |
| ***H01M 50/133*** | (2021.01) |

(56) References Cited

U.S. PATENT DOCUMENTS

| | | | | |
|---|---|---|---|---|
| 2009/0317708 | A1 | 12/2009 | Brandl et al. | |
| 2013/0011721 | A1* | 1/2013 | Kim | H01M 50/548 429/163 |
| 2016/0133882 | A1* | 5/2016 | Lee | H01M 10/0525 429/163 |
| 2016/0133883 | A1* | 5/2016 | Hwang | H01M 50/119 429/163 |
| 2016/0133884 | A1* | 5/2016 | Hwang | H01M 50/117 429/163 |
| 2016/0197318 | A1* | 7/2016 | Yamashita | H01M 50/193 429/185 |
| 2016/0301040 | A1 | 10/2016 | Takahagi et al. | |
| 2017/0025647 | A1* | 1/2017 | Taniguchi | H01M 50/119 |
| 2017/0263899 | A1* | 9/2017 | Takahagi | B32B 15/08 |
| 2017/0271629 | A1 | 9/2017 | Hori et al. | |
| 2018/0138480 | A1* | 5/2018 | Han | H01M 50/126 |
| 2018/0233709 | A1* | 8/2018 | Muraki | H01M 50/191 |
| 2018/0269434 | A1* | 9/2018 | Yu | H01M 10/0525 |
| 2019/0143581 | A1 | 5/2019 | Yasuda et al. | |
| 2019/0189984 | A1 | 6/2019 | Han et al. | |
| 2020/0091473 | A1* | 3/2020 | Imamoto | H01G 11/80 |
| 2020/0215795 | A1* | 7/2020 | Yoshino | B32B 15/09 |
| 2021/0347105 | A1 | 11/2021 | Yasuda et al. | |
| 2023/0089546 | A1 | 3/2023 | Kim et al. | |
| 2023/0207931 | A1 | 6/2023 | Kim et al. | |
| 2024/0083099 | A1 | 3/2024 | Yasuda et al. | |
| 2025/0062451 | A1* | 2/2025 | Kang | H01M 50/133 |

FOREIGN PATENT DOCUMENTS

| | | | | | |
|---|---|---|---|---|---|
| JP | 2008053133 | A | | 3/2008 | |
| JP | 2008251342 | A | | 10/2008 | |
| JP | 2009544492 | A | | 12/2009 | |
| JP | 2012014998 | A | | 1/2012 | |
| JP | 2014047372 | A | † | 3/2014 | |
| JP | 2015009845 | A | | 1/2015 | |
| JP | 2016015225 | A | | 1/2016 | |
| JP | 2016071952 | A | | 5/2016 | |
| JP | 2017027700 | A | | 2/2017 | |
| JP | 2017084786 | A | | 5/2017 | |
| JP | 2017168355 | A | | 9/2017 | |
| JP | 2019021429 | A | | 2/2019 | |
| KR | 20150046067 | A | | 4/2015 | |
| KR | 101752307 | B1 | | 6/2017 | |
| KR | 20170142623 | A | | 12/2017 | |
| KR | 20200037348 | A | | 4/2020 | |
| KR | 102281543 | B1 | | 7/2021 | |
| KR | 20210127636 | A | † | 10/2021 | |
| KR | 20210152969 | A | | 12/2021 | |
| WO | 2017188396 | A1 | | 11/2017 | |
| WO | WO-2018194176 | A1 | * | 10/2018 | B32B 27/18 |
| WO | 2019124281 | A1 | † | 6/2019 | |
| WO | 2020080131 | A1 | | 4/2020 | |
| WO | 2021210908 | A1 | | 10/2021 | |

OTHER PUBLICATIONS

English translation of WO 2018/194176 (Year: 2018).*

Extended European Search Report including Written Opinion for Application No. 22911997.9, dated Oct. 8, 2024, 8 pages.

International Search Report for Application No. PCT/KR2022/021112 mailed Apr. 3, 2023, pp. 1-3.

"Aluminium and Aluminium Alloy Foils", 1994, distributed by Japanese Standards Association (JSA), Jis H 4160, pp. 1-6.

* cited by examiner
† cited by third party

[FIG. 1]

[FIG. 3]
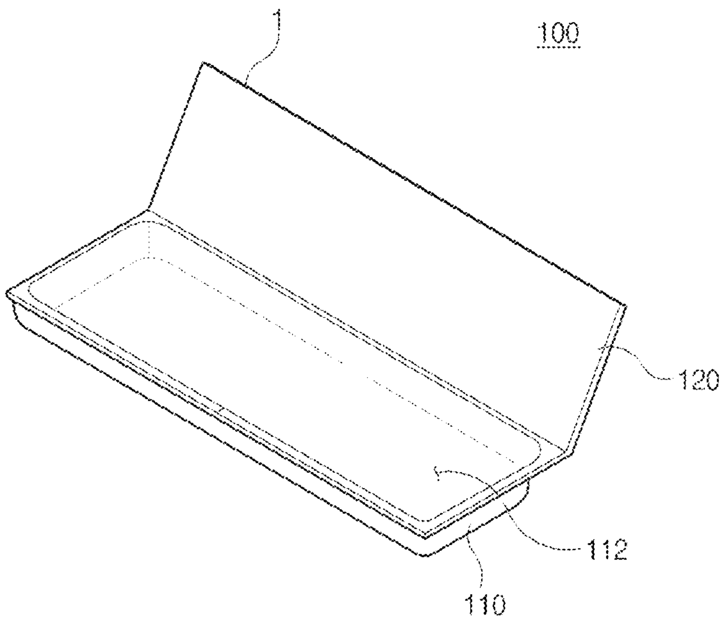
[FIG. 4]
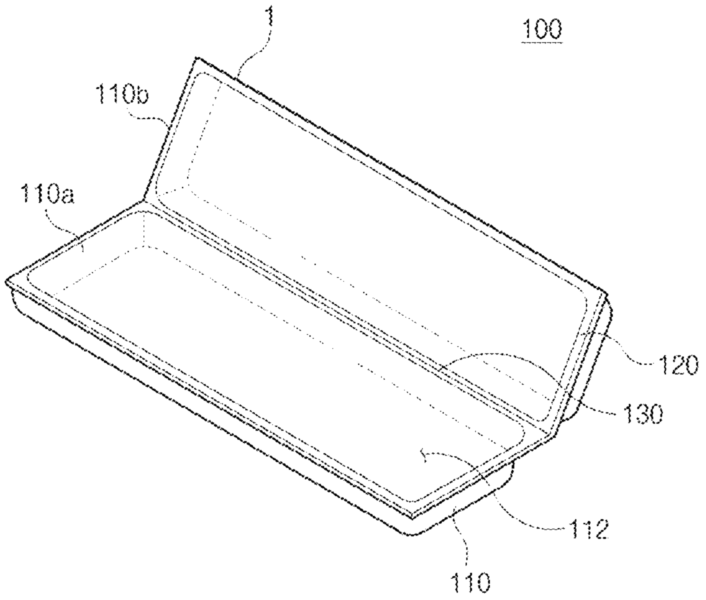

POUCH FILM LAMINATE BODY AND BATTERY CASE MANUFACTURED USING SAME

CROSS-REFERENCE TO RELATED APPLICATIONS

This application is a national phase entry under 35 U.S.C. § 371 of International Application No. PCT/KR2022/021112 filed on Dec. 22, 2022, which claims the benefit of Korean Patent Application No. 10-2021-0187275, filed on Dec. 24, 2021, in the Korean Intellectual Property Office, the disclosures of which are incorporated herein by reference in their entirety.

TECHNICAL FIELD

The present invention relates to a pouch film laminate body and a battery case manufactured using the same, and more specifically, to a pouch film laminate body with excellent moldability and less curling after molding, and a battery case manufactured using the same.

BACKGROUND ART

A secondary battery is applied and used in small products such as digital cameras, P-DVDs, MP3P, mobile phones, PDAs, portable game devices, power tools, and e-bikes, as well as large products that require high power such as electric vehicles and hybrid vehicles, and power storage devices for storing surplus generated power or renewable energy, and power storage devices for backup power.

Typically, a secondary battery is manufactured by applying an electrode active material slurry on a positive electrode current collector and a negative electrode current collector to manufacture a positive electrode and a negative electrode, stacking the positive electrode and the negative electrode on both sides of a separator to form an electrode assembly having a predetermined shape, and then accommodating the electrode assembly in a battery case, followed by injecting an electrolyte thereinto and sealing the case.

The secondary battery is classified into a pouch-type secondary battery, and a can-type secondary battery according to the material of the case accommodating the electrode assembly. The pouch-type secondary battery accommodates the electrode assembly in a pouch made of a flexible polymer material. Also, the can-type secondary battery accommodates the electrode assembly in a case made of a material such as a metal or plastic.

The pouch-type battery case is manufactured by performing press processing on a flexible pouch film laminate body, thereby forming a cup portion. Then, when the cup portion is formed, an electrode assembly is stored in an accommodation space of the cup portion and a sealing portion is sealed to manufacture a secondary battery.

In the press processing, drawing molding is performed by inserting a pouch film into press equipment and applying pressure to a pouch film laminate body with a punch, thereby stretching the pouch film laminate body. The pouch film laminate body is generally formed of a plurality of layers in which a polymer film such as polyethylene terephthalate is laminated on one surface of a gas barrier layer made of a metal, and a sealant layer is laminated on the other surface thereof.

However, in the case of such a typical pouch film laminate body, there is a limitation in molding a deep cup portion due to low moldability, and when filleting is applied to a bottom portion edge and an opening portion edge of a cup portion, there is also a limitation in reducing the radius of the filleting. In addition, there is also a limitation in molding a wall portion of the cup portion close to vertical. Accordingly, there is a problem in that the dead space of a secondary battery increases and the size of an electrode assembly decreases, resulting in a decrease in energy efficiency relative to volume.

DISCLOSURE OF THE INVENTION

Technical Problem

In order to solve the above problem, the present invention is to provide a pouch film laminate body which has excellent drawing moldability, and thus is capable of forming a cup portion with a large molding depth, and which has less curling after molding.

Technical Solution

In an aspect, the present invention provides a pouch film laminate body including a gas barrier layer, a base layer disposed on one surface of the gas barrier layer, and a sealant layer disposed on the other surface of the gas barrier layer, wherein the loop stiffness in an MD direction is 750 mN to 1300 mN.

Preferably, the loop stiffness in a TD direction of the pouch film laminate body may be 750 mN to 1300 mN, wherein the ratio of the loop stiffness in the TD direction to the loop stiffness in the MD direction may be 0.8 to 1.2.

The base layer may have a breakage strength of 10 N/15 mm to 18 N/15 mm in the MD direction.

In addition, according to an embodiment, the base layer may be a laminate body of a polyethylene terephthalate film and a nylon film, and at this time, the polyethylene terephthalate film may have a thickness of 5 μm to 20 μm, and the nylon film may have a thickness of 10 μm to 30 μm.

The gas barrier layer may have a thickness of 50 μm to 100 μm, and may include an aluminum alloy thin film. Preferably, the aluminum alloy thin film may contain 1.2 wt % to 1.7 wt % of iron, and may have a grain size of 10 μm to 13 μm.

The sealant layer may have a thickness of 60 μm to 100 μm, and may include cast polypropylene, acid-treated polypropylene, a polypropylene-butylene-ethylene copolymer, or a combination thereof.

In another aspect, the present invention provides a battery case manufactured by drawing molding the pouch film laminate body of the present invention described above, including a cup portion having a depth of 10 mm or greater, and having a curl height of 25 mm or less.

Advantageous Effects

When the loop stiffness of a pouch film laminate body satisfies the range of the present invention, the limit molding depth is large when molding a cup, the slope of an edge portion of a cup portion may be formed to be large, and there is less curling after the cup molding. Therefore, when the pouch film laminate body according to the present invention is used, it is possible to manufacture a battery case with a large accommodation volume of an electrode assembly, and with less curling.

BRIEF DESCRIPTION OF THE DRAWINGS

FIG. 3 is a perspective view of a battery case according to an embodiment of the present invention.

FIG. 4 is a perspective view of a battery case according to another embodiment of the present invention.

BEST MODE FOR CARRYING OUT THE INVENTION

Hereinafter, the present invention will be described in more detail.

It will be understood that terms or words used in the present specification and claims shall not be construed as being limited to having meanings defined in commonly used dictionaries, but should be interpreted as having meanings and concepts consistent with the technical idea of the present invention based on the principle that an inventor may appropriately define concepts of the terms to best explain the invention.

In the present invention, a "machine direction (MD)" refers to a longitudinal direction of a pouch film laminate body, and a "transverse direction (TD)" refers to a width direction of the pouch film laminate body.

The inventors of the present invention have repeatedly conducted research to manufacture a battery case which has a large accommodation space of a battery assembly, and thus is capable of implementing a high energy density, and which has less curling after cup molding, and thus, has fewer process defects, and as a result, have found that the above objective may be achieved by manufacturing a battery case using a pouch film laminate body satisfying a specific range of loop stiffness, and have completed the present invention.

<Pouch Film Laminate Body>

Figure 1:
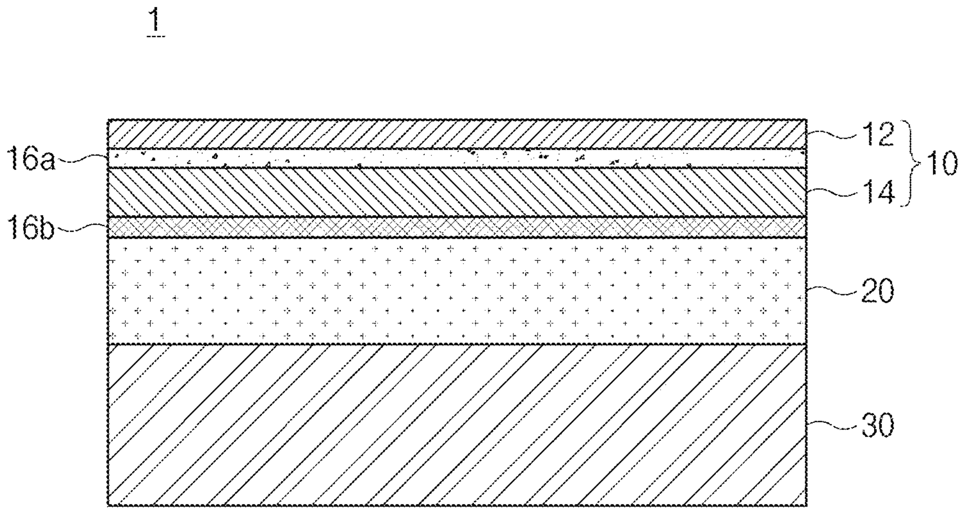
FIG. 1 is a cross-sectional view of a pouch film laminate body according to an embodiment of the present invention.

FIG. 1 illustrates an embodiment of a pouch film laminate body according to the present invention. Hereinafter, referring to FIG. 1, the pouch film laminate body according to the present invention will be described.

Referring to FIG. 1, a pouch film laminate body 1 according to the present invention includes a gas barrier layer 20, a base layer 10 disposed on one surface of the gas barrier layer, and a sealant layer 30 disposed on the other surface of the gas barrier layer, and is characterized in that loop stiffness in an MD direction of the pouch film laminate body satisfies 750 mN to 1300 mN, preferably 800 mN to 1200 mN, more preferably 800 mN to 1000 mN.

When the loop stiffness in the MD direction of the pouch film laminate body 1 satisfies 750 mN to 1300 mN, a cup portion with a large molding depth may be formed due to excellent drawing moldability, and the clearance required for cup molding is small, so that a wall portion may be formed to have a sharp slope, and curling resistance is excellent after the molding. Specifically, when the MD direction loop stiffness of the pouch film laminate body is less than 750 mN, the drawing moldability is poor, so that there is a limitation in increasing the accommodation volume of a cup portion, and when the MD direction loop stiffness is greater than 1300 mN, curling may occur severely after cup forming. If the volume of a cup portion is small, it is not possible to implement high-energy density since there is a few number of battery assemblies which may be accommodated, and if curling occurs after cup molding, there may be a problem of a vacuum break phenomenon during pouch transfer for a battery assembly process and/or wrinkles of a battery case during a degas sealing process.

In addition, the pouch film laminate body of the present invention may have a ratio of the loop stiffness in the TD direction to the loop stiffness in the MD direction of 0.8 to 1.2, preferably 0.9 to 1.1. When the ratio of the TD direction loop stiffness to the MD direction loop stiffness of the pouch film laminate body satisfies the above range, it is possible to suppress the occurrence of damage, wrinkles, or the like during a cup molding process.

Specifically, it is preferable that the TD direction loop stiffness of the pouch film laminate body of the present invention satisfies 750 mN to 1300 mN, preferably 800 mN to 1200 mN, more preferably 800 mN to 1000 mN. When the TD direction loop stiffness satisfies the above range, drawing moldability is excellent, and it is possible to effectively suppress curling after cup molding, and since the difference with the loop stiffness in the MD direction is not large, it is possible to suppress the occurrence of damage or wrinkles after molding.

Figure 2:
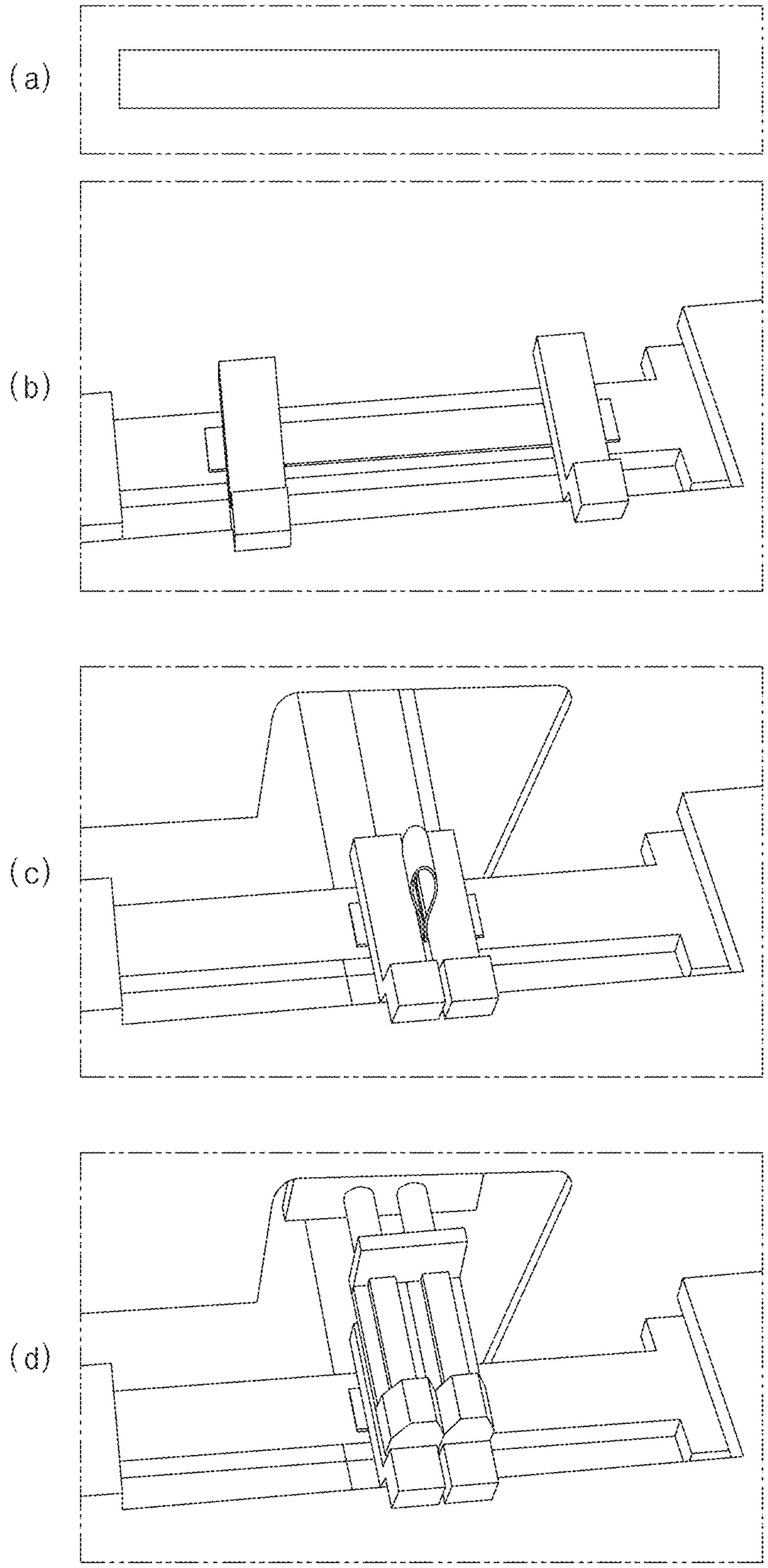
FIGS. 2A-2D are schematic views illustrating steps of a method for measuring a loop stiffness of a pouch film laminate body.

FIGS. 2A-2D illustrates a process of measuring the loop stiffness of a pouch film laminate body of the present invention. As illustrated in FIG. 2A, the pouch film laminate body is first cut to a width×length of 15 mm×150 mm to prepare a measurement sample. In the case of measuring loop stiffness in the MD direction, the cutting is performed such that the MD direction coincides with a width direction of the measurement sample, and in the case of measuring loop stiffness in the TD direction, the cutting is performed such that the TD direction coincides with the width direction of the measurement sample. Thereafter, as illustrated in FIG. 2B, both ends of the measurement sample are fixed by being inserted into clips of a measurement apparatus, and as illustrated in FIG. 2C, the clips are moved to transform the measurement sample into a loop shape. Thereafter, as shown in FIG. 2D, the loop is press-fitted at a speed of 5 mm/min to measure a maximum load value required for transforming the loop, and the value is set to a loop stiffness value.

Since the loop stiffness of a pouch film laminate body is affected by the thickness, material, and the like of each layer (i.e., a base layer, a gas barrier layer, a sealant layer) constituting the pouch film laminate body, it is possible to manufacture a pouch film laminate body having desired loop stiffness by controlling the thickness, material, and the like of each layer constituting the pouch film laminate body. For example, a gas barrier layer may be formed of a soft aluminum thin film (e.g. AA8021) having high elongation, a gas barrier layer may be formed thick to a thickness of 50 μm to 100 μm, and a base layer may be composed of a film or film laminate body having an MD direction breakage strength of 10 N/15 mm to 18 N/15 mm so as to manufacture a pouch film laminate body satisfying the loop stiffness of the present invention. However, a method for manufacturing a pouch film laminate body satisfying the loop stiffness value of the present invention is not limited thereto.

Next, each layer of the pouch film laminate body according to the present invention will be described.

Base Layer

The base layer 10 is disposed on the outermost layer of a battery case to protect an electrode assembly from external impacts and to electrically insulate the electrode assembly.

The base layer 10 may be made of a polymer material, and for example, may be made of a polymer material selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, and Teflon.

The base layer 10 may have a single-layered structure, or may have a multi-layered structure in which different polymer films 12 and 14 are laminated as illustrated in FIG. 1. When the base layer 10 has a multi-layered structure, an adhesive layer 16*a* may be interposed between the polymer films.

Meanwhile, the base layer 10 may have an overall thickness of 5 μm to 60 μm, preferably 10 μm to 50 μm, more preferably 20 μm to 50 μm. When the base layer has a multi-layered structure, the above thickness is a thickness including the thickness of an adhesive layer interposed between a film and a film. At this time, the thickness of the adhesive layer may be 1 μm to 10 μm, preferably 1 μm to 7 μm, more preferably 1 μm to 4 μm. When the thickness of the base layer 10 satisfies the above range, durability, insulation properties, and moldability are excellent. If a base layer is too thin, durability may be reduced, and the base layer may break during a molding process, and if too thick, moldability may be degraded, the overall thickness of the pouch film laminate film may increase, and a battery accommodation space may be reduced, resulting in a decrease in energy density.

In the present invention, the base layer may have an MD direction breakage strength of 10 N/15 mm to 18 N/15 mm, preferably 10 N/15 mm to 15 N/15 mm. When the MD direction breakage strength of the base layer satisfies the above range, an MD direction loop stiffness value required in the present invention may be easily implemented. If the MD direction breakage strength of the base layer is too small, the MD direction loop stiffness of the pouch film laminate body is degraded, and if too large, the MD direction loop stiffness of the pouch film laminate body becomes too great.

Meanwhile, the MD direction breakage strength of the base layer is a strength at which breakage occurs when the base layer is stretched in the MD direction, and may be measured by a method in which a film or a film laminate body constituting the base layer is cut such that that the MD direction is the longitudinal to prepare a measurement sample, and then the measurement sample is mounted on a UTM apparatus and stretched to measure the maximum strength at which breakage occurs.

Since the MD direction breakage strength of a base layer varies depending on the type of a film constituting the base layer, the thickness of the film, and/or the thickness of an adhesive layer, and the like, it is possible to form a base layer having desired breakage strength by suitably controlling the type of the film, the thickness of the film, and/or the thickness of the adhesive layer.

According to an embodiment, the base layer 10 may have a laminate structure of a polyethylene terephthalate (PET) film and a nylon film. At this time, it is preferable that the nylon film is disposed on the gas barrier layer 20 side, that is, on the inside, and the polyethylene terephthalate film is disposed on the surface side of the battery case.

Polyethylene terephthalate (PET) has excellent durability and electrical insulation, so that when the PET film is disposed on the surface side, durability and insulation properties are excellent. However, since the PET film has weak adhesion with the aluminum alloy thin film constituting the gas barrier layer 20, and has a different stretching behavior, when the PET film is disposed on the gas barrier layer side, de-lamination of the base layer and the gas barrier layer may occur during a molding process, and the gas barrier layer is not uniformly stretched, which may cause a problem in which the moldability is degraded. In comparison, since the nylon film has a similar stretching behavior to that of the aluminum alloy thin film constituting the gas barrier layer 20, when the nylon film is disposed between the polyethylene terephthalate and the gas barrier layer, there may be an effect of improving the moldability.

The polyethylene terephthalate film may have a thickness of 5 μm to 20 μm, preferably 5 μm to 15 μm, more preferably 7 μm to 15 μm, and the nylon film may have a thickness of 10 μm to 40 μm, preferably 15 μm to 35 μm, more preferably 15 μm to 25 μm. When the thickness of the polyethylene terephthalate film and the thickness of the nylon film satisfy the above ranges, moldability, bendability, and durability are improved, and a loop stiffness value required in the present invention may be easily implemented.

Gas Barrier Layer

The gas barrier layer 20 is to secure mechanical strength of the battery case, block access of gas, moisture, or the like outside a secondary battery, and prevent leakage of an electrolyte.

The gas barrier layer may have a thickness of 50 μm to 100 μm, preferably 55 μm to 90 μm, more preferably 55 μm to 80 μm. When the thickness of the gas barrier layer satisfies the above range, it is easy to implement a desired loop stiffness value, and moldability is increased, so that it is possible to mold a cup portion deep and sharp. Typically, a gas barrier layer is commonly formed using an aluminum alloy thin film having a thickness of 40 μm. However, when the thickness of a gas barrier layer is about 40 μm, the bendability of a pouch film laminate body is poor, so that it is difficult to implement a desired loop stiffness value, and the moldability is poor, so that there is a limitation in increasing a molding depth, and it is difficult to mold a cup portion to have a sharp edge.

Meanwhile, the gas barrier layer may be made of a metal material, and may specifically be composed of an aluminum alloy thin film.

The aluminum alloy thin film may include aluminum, and a metal element other than the aluminum, for example, one or two or more selected from the group consisting of iron (Fe), copper (Cu), chromium (Cr), manganese (Mn), nickel (Ni), magnesium (Mg), silicon (Si) and zinc (Zn).

Preferably, the aluminum alloy thin film may have an iron (Fe) content of 1.2 wt % to 1.7 wt %, preferably 1.3 wt % to 1.7 wt %, more preferably 1.3 wt % to 1.45 wt %. When the iron (Fe) content in the aluminum alloy thin film is less than 1.2 wt %, the strength of the aluminum alloy thin film is degraded, which may cause cracks and pinholes during molding, and when greater than 1.7 wt %, the flexibility of the aluminum alloy thin film is reduced, so that there is a limit to improving moldability and bendability.

In addition, the aluminum alloy thin film includes an aluminum alloy thin film having a grain size of 10 μm to 13 μm, preferably 10.5 μm to 12.5 μm, more preferably 11 μm to 12 μm. When the grain size of the aluminum alloy thin film satisfies the above range, a molding depth may be increased without the generation of pinholes or cracks during cup forming. When the grain size of the aluminum alloy thin film is greater than 13 μm, the strength of the aluminum alloy thin film is reduced, and more cracks and pinholes are generated due to difficulty in dispersing internal stress during stretching, and when the grain size is less than 10 μm, the flexibility of the aluminum alloy thin film is reduced, so that there is a limit to improving moldability and bendability.

The grain size varies depending on a composition of the aluminum alloy thin film and a processing method of the aluminum alloy thin film, and may be measured by observing a cross-section in a thickness direction of the aluminum alloy thin film with a scanning electron microscope (SEM). Specifically, in the present invention, an SEM image of the cross-section in the thickness direction of the aluminum alloy thin film is obtained using a scanning electron microscope, and the maximum diameter of any 30 grains among grains observed in the SEM image is measured, and then the average value thereof is evaluated as a grain size.

Specifically, the aluminum alloy thin film may be an aluminum alloy with the alloy number AA8021, but is not limited thereto.

Sealant Layer

The sealant layer 30 is to be bonded through thermal compression, thereby sealing a battery case, and is positioned in the innermost layer of the pouch film laminate body 1.

The sealant layer 30 is a surface in contact with an electrolyte and an electrode assembly after being molded into the battery case, and thus, is required to have insulation properties and corrosion resistance, and is required to completely seal the inside to block the movement of substances between the inside and the outside, and thus is required to have high sealing properties.

The sealant layer 30 may be made of a polymer material, and for example, may be made of one or more selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisazole, polyarylate, and Teflon, and among the above, it is particularly preferable that polypropylene (PP) is included, which has excellent mechanical properties such as tensile strength, stiffness, surface hardness, abrasion resistance, and heat resistance, and excellent chemical properties such as corrosion resistance.

More specifically, the sealant layer 30 may include polypropylene, cast polypropylene (CPP), acid-modified polypropylene, a polypropylene-butylene-ethylene copolymer, or a combination thereof.

The sealant layer 30 may have a single-layered structure, or may have a multi-layered structure including two or more layers composed of different polymer materials.

The sealant layer may have a total thickness of 60 μm to 100 μm, preferably 60 μm to 90 μm, more preferably 70 μm to 90 μm. If the sealant layer is too thin, the sealing durability and insulation properties may be reduced, and if too thick, the bendability may be reduced and the total thickness of the pouch film laminate body may increase, resulting in a decrease in energy density relative to volume.

The pouch film laminate body of the present invention as described above may be manufactured through a method known in the art for manufacturing a pouch film laminate body. For example, the pouch film laminate body of the present invention may be manufactured through a method in which the base layer 10 is attached to an upper surface of the gas barrier layer 20 through an adhesive, and then the sealant layer 30 is formed on a lower surface of the gas barrier layer 20 through co-extrusion or an adhesive, but is not limited thereto.

The pouch film laminate body according to the present invention may have a total thickness of 160 μm to 200 μm, preferably 180 μm to 200 μm. When the thickness of the pouch film laminate body satisfies the above range, it is possible to increase a molding depth while minimizing the reduction in a battery accommodation space, the degradation in sealing durability, and the like due to an increase in the thickness of the pouch laminate body.

<Battery Case>

FIG. 3 and FIG. 4 illustrate embodiments of the battery case according to the present invention. Hereinafter, referring to FIG. 3 and FIG. 4, the battery case according to the present invention will be described.

As illustrated in FIG. 3 and FIG. 4, the battery case 100 according to the present invention is manufactured by drawing-molding the pouch film laminate body 1 of the present invention described above, and includes at least one cup portion 110*a* or 110*b*.

Since the pouch film laminate body 1 is the same as described above, a specific description thereof will be omitted.

The cup portions 110*a* and 110*b* are spaces 112 for accommodating an electrode assembly (not shown) and an electrolyte (not shown), and are prepared by drawing-molding the pouch film laminate body 1 using a punch or the like. At this time, the drawing molding may be performed by pressurizing the punch to the side of a sealant layer of the pouch film laminate body 1.

Meanwhile, the battery case 100 according to the present invention may include one cup portion 110*a* as illustrated in FIG. 3, or two cup portions 110*a* and 110*b* as illustrated in FIG. 4.

Meanwhile, the battery case 100 according to the present invention includes a lower case 110 and an upper case 120, and the cup portions 110*a* and 110*b* may be formed only in one of the lower case 110 and the upper case 120, or both. When the pouch film laminate body 1 is molded using a one-cup molding apparatus, as illustrated in FIG. 3, it is possible to manufacture a battery case having one cup portion, and when molded using a two-cup molding apparatus, as illustrated in FIG. 4, it is possible to manufacture a battery case in which a cup portion is formed in both the lower case 110 and the upper case 120.

After the electrode assembly is accommodated in the cup portions 110*a* and 110*b*, and the electrolyte is injected thereto, the upper case 120 is folded to be placed on an upper end of the lower case 110 such that that the electrode assembly and the electrolyte are isolated from the outside.

Thereafter, edge portions of the upper case 120 and the lower case 110 are thermally compressed to perform a sealing process.

Since the battery case according to the present invention is manufactured using the pouch film laminate body 1 having high loop stiffness of 750 mN to 1300 mN in the MD direction as described above, the bendability is excellent, so that the limit molding depth is large when molding a cup portion, the slope of an edge portion of the cup portion may be formed to be large, and curling may be minimized after cup molding.

Therefore, the battery case of the present invention may increase an accommodation volume in a cup portion compared to the prior art, and as a result, the volume of an electrode assembly which may be accommodated increases, so that high-energy density may be implemented, and defects caused by the occurrence of curling after molding may be reduced to a minimum.

Specifically, in the battery case according to the present invention, a cup portion depth is 10 mm or greater, preferably 10 mm to 30 mm, and a curl height is 25 mm or less, preferably 20 mm or less, more preferably 15 mm or less.

Meanwhile, when there are two cup portions in the battery case, the cup portion depth refers to the sum of the depth of a cup portion of the upper case and the depth of a cup portion of the lower case.

In addition, the curl height of the battery case is obtained by measuring, with an iron straight ruler, the height at which each edge of the battery case is curled up when a cup portion of the battery case is fixed on the floor using double-sided tape, and evaluating the largest value of the measured heights as the curl height.

MODE FOR CARRYING OUT THE INVENTION

Hereinafter, the present invention will be described in more detail with reference to specific examples.

Example 1

On one surface of a AA8021 aluminum (Al) alloy thin film (Manufacturer: SaMa aluminum) having a thickness of 60 μm, a nylon film (Product name: Nylon 6, manufacturer: Hyosung) having a thickness of 25 μm and a polyethylene terephthalate (PET) film (Manufacturer: Hyosung) having a thickness of 12 μm were laminated in a dry lamination manner using a urethane adhesive to form a base layer. At this time, the urethane adhesive was applied such that the adhesive layer has a thickness of 3 μm. Next, cast polypropylene (CPP) molten on the other surface of the aluminum alloy thin film was co-extruded, thereby forming a sealant layer having a thickness of 8 μm to manufacture a pouch film laminate body.

Example 2

A pouch film laminate body was manufactured in the same manner as in Example 1, except that a AA8021 aluminum (AL) alloy thin film having a thickness of 80 μm was used.

Example 3

A pouch film laminate body was manufactured in the same manner as in Example 1, except that a nylon film (Product name: Nylon 6, manufacturer: Hyosung) having a thickness of 15 μm and a polyethylene terephthalate (PET) film (Manufacturer: Hyosung) having a thickness of 12 μm were laminated in a dry lamination manner using a urethane adhesive to form a base layer.

Comparative Example 1

A pouch film laminate body was manufactured in the same manner as in Example 3, except that a AA8021 aluminum (AL) alloy thin film (manufacturer: SaMa Aluminum) having a thickness of 40 μm was used.

Comparative Example 2

A pouch film laminate body was manufactured in the same manner as in Example 1, except that the urethane adhesive was applied such that the adhesive layer has a thickness of 5 μm to form a base layer.

Experimental Example 1: Measurement of Loop Stiffness

Each of the pouch film laminate bodies manufactured according to Examples 1 to 3 and Comparative Examples 1 and 2 was cut to have an MD direction length of 15 mm and a TD direction length of 150 mm to prepare first samples.

In addition, each of the pouch film laminate bodies manufactured according to Examples 1 to 3 and Comparative Examples 1 and 2 was cut to have an TD direction length of 15 mm and a MD direction length of 150 mm to prepare second samples.

After transforming each of the first and second samples into a loop shape to have a radius of 16 mm and a circumference of 100 mm, a force was applied thereto at a speed of 5 mm/min to measure the maximum strength required to transform the loop, and the maximum strength was evaluated as loop stiffness. The measurement results are shown in [Table 1] below.

Experimental Example 2: Measurement of Base Layer Film MD Direction Breakage Strength The base layer film (nylon film/adhesive layer/polyethylene terephthalate film laminate body) used in each of Examples 1 to 3 and Comparative Examples 1 and 2 was cut to a width×length of 15 mm×80 mm to prepare a sample.

At this time, the cutting was performed such that the longitudinal direction of the sample coincided with the MD direction of the pouch film laminate body. The sample was fixed to a UTM device with a 30 mm grip gap, and then the sample was pulled at a tensile speed of 50 mm/min to measure a strength at which breakage occurred. The measurement results are shown in [Table 1] below.

Experimental Example 3: Measurement of Limit Molding Depth

The pouch film laminate body manufactured in each of Examples 1 to 3 and Comparative Examples 1 and 2 was cut to a size of 240 mm×200 mm, and then molded in each of a battery case molding apparatus having one cup molding portion with a size of 160 mm in width×90 mm in height and a battery case molding apparatus having two cup molding portions with a size of 160 mm in width×61 mm in height while varying a molding depth to measure the maximum molding depth (limit molding depth) just before cracking occurred. Here, a punch and a molding portion of the battery case molding apparatus were filleted at corners and edges, wherein the corner of the punch had a curvature of 2 mm and the edge thereof had a curvature of 0.5 mm, and the corner of the molding portion had a curvature of 2.5 mm and the edge thereof had a curvature of 0.5 mm. Also, the clearance of the punch and the molding portion was 0.5 mm. In the battery case molding apparatus having two cup molding portions, the distance between the two molding portions was 1 mm. The measurement results are shown in [Table 1] below.

Experimental Example 4: Measurement of Curl Properties

A cup portion of a battery case molded into one cup to a limit molding depth in Experimental Example 3 was fixed on the floor using double-sided tape, and the height at which each edge of the battery case was curled up was measured with an iron straight ruler, and the largest value of the measured heights was evaluated as a curl height. The measurement results are shown in [Table 1] below.

TABLE 1

| | | Example 1 | Example 2 | Example 3 | Comparative Example 1 | Comparative Example 2 |
|---|---|---|---|---|---|---|
| Loop stiffness (mN) | Sample 1 (MD) | 980 | 1200 | 815 | 600 | 1500 |
| | Sample 2 (TD) | 945 | 1100 | 772 | 562 | 1300 |
| Base layer MD direction breakage strength (N/15 mm) | | 13.0 | 13.0 | 9.6 | 9.6 | 19.2 |
| Limit molding depth (mm) | One-cup molding | 15 | 16 | 14 | 9 | 16 |
| | Two-cup molding | 10.2 | 10.6 | 9 | 6.5 | 11 |
| Curl height (mm) | | 10 | 19 | 8 | 5 | 30 |

As shown in [Table 1] above, when a pouch film laminate body whose MD direction loop stiffness satisfied the range of the present invention was used to manufacture a battery case, a battery case having a large limit molding depth and a small curl was manufactured. In comparison, when the pouch film laminate body of Comparative Example 1, in which the MD direction loop stiffness was less than 730 mN, was used, the limit molding depth was small, and when the pouch film laminate body of Comparative Example 2, in which the loop stiffness was 1300 mN or greater, was used, the moldability was excellent but curling severely occurred after the cup molding.

The invention claimed is:

1. A battery case manufactured by drawing molding a pouch film laminate body, the pouch film laminate body comprising:

a gas barrier layer defining a thickness of 60 μm to 100 μm;

a base layer disposed on one surface of the gas barrier layer, the base layer including a laminate structure of a polyethylene terephthalate film and a nylon film; and a sealant layer disposed on an opposite surface of the gas barrier layer, the sealant layer defining a thickness of 60 μm to 100 μm, wherein a loop stiffness of the pouch film laminate body in a machine direction (MD) of the pouch film laminate body is 750 mN to 1300 mN, a ratio of a loop stiffness of the pouch film laminate body in a transverse direction of the pouch film laminate body to the loop stiffness in the machine direction is 0.9 to 1.1, wherein the battery case includes at least one cup portion, wherein the cup portion has a depth of 10 mm or greater, and a curl height of 25 mm or less.

2. The battery case of claim 1, wherein a loop stiffness of the pouch film laminate body in a transverse direction (TD) of the pouch film laminate body is 750 mN to 1300 mN.

3. The battery case of claim 1, wherein the base layer has a breakage strength of 10 N/15 mm to 18 N/15 mm in the machine direction.

4. The battery case of claim 1, wherein the polyethylene terephthalate film has a thickness of 5 μm to 20 μm, and the nylon film has a thickness of 10 μm to 30 μm.

5. The battery case of claim 1, wherein the gas barrier layer comprises an aluminum alloy thin film.

6. The battery case of claim 5, wherein the aluminum alloy thin film comprises 1.2 wt % to 1.7 wt % of iron.

7. The battery case of claim 5, wherein the aluminum alloy thin film has a grain size of 10 μm to 13 μm.

8. The battery case of claim 1, wherein the sealant layer comprises cast polypropylene, acid-treated polypropylene, a polypropylene-butylene-ethylene copolymer, or a combination thereof.

* * * * *